Dec. 24, 1963  C. G. JANIS ET AL  3,115,536
METHOD OF DETERMINING THE THICKNESS OF
ETCHED TETRAFLUOROETHYLENE SURFACES
Filed Jan. 18, 1961
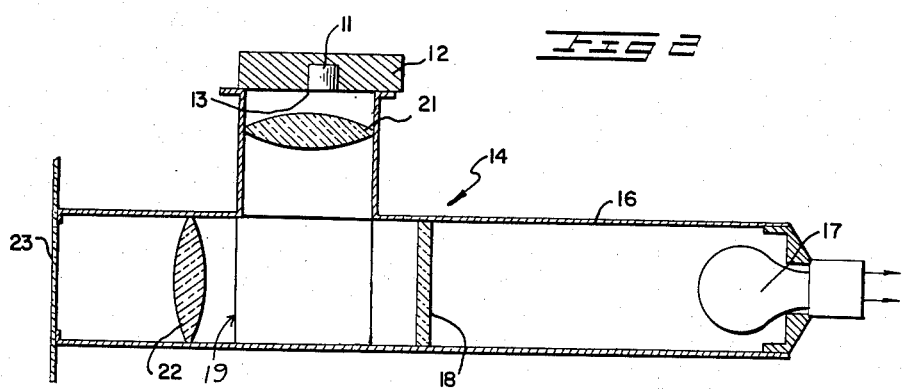
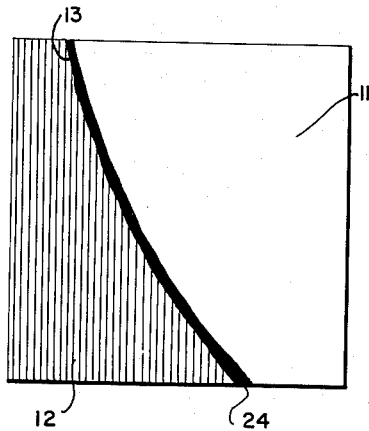
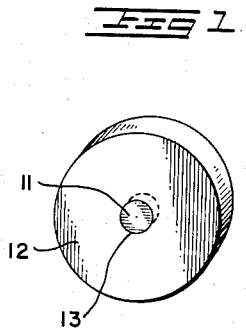
INVENTORS
CARL G. JANIS
WILLIAM C. PEAK, JR.
BY  R. P. Miller
ATTORNEY

United States Patent Office 3,115,536
METHOD OF DETERMINING THE THICKNESS OF ETCHED TETRAFLUOROETHYLENE SURFACES
Carl G. Janis and William C. Peak, Jr., Winston-Salem, N.C., assignors to Western Electric Company, Incorporated, New York, N.Y., a corporation of New York
Filed Jan. 18, 1961, Ser. No. 83,582
5 Claims. (Cl. 88—14)

This invention relates to a method of determining the depth and continuity of a surface etch, and more particularly to a method of potting an etched base material and subjecting junctures between the etch, the base material and the potting material to polarized light to produce a readily visible display of the etched surface which may be examined in a metallograph to determine the depth and continuity of the etch.

A tetrafluoroethylene product such as sold under the trademark "Teflon," has been found to have such a low coefficient of friction that it will not adhere to other materials and cannot be bonded by use of the usual impregnants or adhesives. In order to effectuate a bond between a tetrafluoroethylene article and another article, it is necessary to etch the surface of the tetrafluoroethylene article and then apply a cementing compound. Usually the tetrafluoroethylene part is etched with a nascent sodium. In order to evaluate the etching process, it is necessary to observe the depth of etch and the continuity of the etched surface. The color of the etched surface is substantially the same as that of the tetrafluoroethylene article, thus substantially precluding visual observation to determine continuity. Further, the depth of the etched surface is minute, and this factor, in combination with the lack of contrast in colors, renders impossible an observation to determine the thickness of a cross section of the etched surface.

It is an object of the present invention to provide a new and improved method for determining the depth and continuity of a surface etch.

It is another object of tihs invention to provide a method for readily ascertaining the depth and continuity of an etch on a surface of tetrafluoroethylene material.

An additional object of this invention resides in a new and improved method of examining etched surfaces of a tetrafluoroethylene article by potting the article in a red, settable composition and then exposing the junctures of the etch to polarized light in a metallograph.

A still further object of this invention is the provision of a method of potting an etched article in a composition of contrasting color, and then exposing the junctures of the etch to polarized light whereafter an image of the junctures is magnified and photographed, or observed, to determine the depth and continuity of the etch.

With these and other objects in view, the present invention contemplates a method of ascertaining the continuity and depth of an etched surface of an article composed of tetrafluoroethylene. First, the etched article is potted in a suitable composition having a red color, and then the potted article is severed to expose the junctions between the etch, the potting composition, and the tetrafluoroethylene. The potted article is mounted in a metallograph and the junctions are subjected to a polarized light. Thereafter an image of the junction is magnified and reproduced whereupon the etch thickness may be measured and the continuity observed.

Other objects and advantages of the present invention will be apparent from the following detailed description when considered in conjunction with the accompanying drawing, wherein:

FIG. 1 is a perspective view of an etched tetrafluoroethylene article potted in a red-colored polyester resin;

FIG. 2 is a cross-sectional representation of a metallograph having the potted article shown in FIG. 1 mounted therein for observation of the junction between the potting composition and the etched surface, and the delineation between the etched surface and the tetrafluoroethylene article; and FIG. 3 is an enlarged showing of a screen of the metallograph shown in FIG. 2 wherein the junctions between the surface etch, the potting resin, and the article are depicted.

Referring to FIG. 1 there is shown a cylindrical plug 11 of etched tetrafluoroethylene, sold under the trademark Teflon. Prior to potting, the tetrafluoroethylene plug may be degreased, dipped in an etching solution of diethylene glycol and sodium-naphthalene, dried in a nitrogen atmosphere, rinsed in a steam jet, and then dried with filtered air. The color of the etch produced by this operation is such as to be substantially the same as the natural color of the tetrafluoroethylene, namely, translucent milky white.

In order to prepare a sample for examination of the continuity and depth of the etch, the tetrafluoroethylene plug 11 is first potted in a red potting compound 12, such as a synthetic resin formed by the condensation of phenols with formaldehyde sold under the trademark Bakelite. The potting composition should include a red coloring agent, such as a dye or pigment filler, to give a light reflection in the range from 6500 angstroms to 7000 angstroms. After potting, the sample is then severed to expose a circular etched surface 13.

Next, the potted tetrafluoroethylene plug 11 is mounted in a metallograph generally designated by the reference numeral 14 in FIG. 2. The metallograph consists of a housing 16 in which is mounted a source of monochromatic illumination 17 which directs light through a polarizer 18 onto a mirror system 19. Suitable filters, of course, may be provided to convert polychromatic light from a source to monochromatic light. A portion of the plane polarized light is reflected by the mirror system 19 through a convex lens 21 onto the surface of the potted tetrafluoroethylene plug 11. A portion of the light striking the red potting compound is reflected into the etched surface 13, thereby causing the etched surface of the plug 11 to assume a black color that vividly contrasts with the red potting compound and the milky white plug.

An image of the potted plug 11 is reflected back through the lens 21, through the mirror system 19, through a second convex lens 22, and onto a suitable viewing medium 23 such as a ground glass screen, upon which it appears magnified from about 500 to 530 diameters. It is also contemplated that a photographic, color-sensitive film may be substituted for the viewing medium 23.

The resultant image appearing on the viewing medium 23 is shown in FIG. 3, where it will be noticed that the etched surface 13 appears as an irregular black band 24 positioned between the images of the milky white tetrafluoroethylene 11 and the red potting compound 12. Inasmuch as the optical system of the metallograph 14 produces known magnification, the thickness of the etched surface 13 may be readily measured. Further, the band 24 may be viewed to verify the continuity of the surface.

Experiments have been tried with many different potting compounds, but in each instance it was impossible to obtain the vivid black line showing the thickness of the etched surface. It was only when an etched tetrafluoroethylene part was potted in a red potting compound having the ability to reflect light only in the range of 6500 A. to 7000 A. (angstroms) that clear lines of delineation were observed between the etched surface, the tetrafluoroethylene, and the potting compound. It is believed that this phenomenon is due to the reflection of light from the red potting compound into the etched surface in a spectrum range that causes the etched surface to become visible and appear as a black line.

It is understood that the above-described methods and arrangements are simply illustrative of an application of the principles of the invention. Many other methods and arrangements may be devised by those skilled in the art which will embody the principles of the invention and fall within the spirit and scope thereof.

What is claimed is:

1. The method of determining the continuity of surface etch on tetrafluoroethylene which consists of the steps of potting etched tetrafluoroethylene in a red potting material, exposing the junction between the etched surface and the potting material, illuminating said junction with polarized light, and optically magnifying an image of said junction.

2. The method of determining the depth of surface etch on tetrafluoroethylene which consists of the steps of potting the etched tetrafluoroethylene in a red potting material which reflects visible light from within the range of 6500 angstroms to 7000 angstroms, exposing the junction between said etched surface and the potting material, illuminating said junction with polarized light, producing a magnified image of said junction, and measuring the width of the produced image.

3. A method of determining the depth and continuity of an etched surface of an article composed of tetrafluoroethylene having a natural milky white color consisting of the steps of potting the article in a synthetic resin formed by the condensation of phenol and formaldehyde to which has been added a red coloring agent to give a light reflection within the range of 6500 angstroms to 7000 angstroms; severing the potted article to expose the delineation between the article and the etched surface and the juncture between the surface and the potting resin; impinging polarized light on the juncture; magnifying reflections of said light; and projecting said reflections onto a screen to give a visible display of the delineation and juncture.

4. The method of determining the depth of surface etch on tetrafluoroethylene which consists of the steps of potting the etched tetrafluoroethylene in red polyester resin which reflects visible light from within the range of 6500 A. to 7000 A., severing the potted tetrafluoroethylene to expose an area representing the junction between said etched surface and the polyester resin, and the delineation between the etched surface and the tetrafluoroethylene; illuminating said area with polarized light; optically producing a magnified image of said area; photographically recording the magnified image of said area; and measuring the width of the etched surface of the area on said photographic reproduction.

5. A method of determining the thickness of an etched tetrafluoroethylene surface by observation of the surface on a screen of a metallograph having a lens system utilizing monochromatic polarized light to provide a magnified image of the surface on the screen which consists of the steps of potting the etched tetrafluoroethylene in a red polyester resin, shearing the potted tetrafluoroethylene to expose the juncture of the etched tetrafluoroethylene surface and the red polyester resin, placing the sheared potted tetrafluoroethylene into the metallograph whereby an image of the etched surface zone is produced on said screen and measuring the thickness of the surface zone.

References Cited in the file of this patent

UNITED STATES PATENTS

| | | |
|---|---|---|
| 2,074,106 | Foster | Mar. 16, 1937 |
| 2,256,102 | Reason | Sept. 16, 1941 |
| 2,996,762 | McCormick | Aug. 22, 1961 |

FOREIGN PATENTS

| | | |
|---|---|---|
| 722,746 | Germany | July 20, 1942 |